Oct. 18, 1966     J. C. BARNES, JR., ET AL     3,279,694
TOTALIZER SELECTING CONTROL

Filed July 6, 1965     2 Sheets-Sheet 1

INVENTORS
JOHN C. BARNES, JR.
GEORGE C. BEASON

BY Louis A. Kline

Richard W. Lavin

THEIR ATTORNEYS

INVENTORS
JOHN C. BARNES, JR.
GEORGE C. BEASON
BY
THEIR ATTORNEYS

United States Patent Office 3,279,694
Patented Oct. 18, 1966

3,279,694
TOTALIZER SELECTING CONTROL
John C. Barnes, Jr., and George C. Beason, both of Dayton, Ohio, assignors to The National Cash Register Company, Dayton, Ohio, a corporation of Maryland
Filed July 6, 1965, Ser. No. 469,459
5 Claims. (Cl. 235—60.48)

This invention relates to improvements in accounting machines and the like, and more particularly to a keyboard construction for controlling the operation of an add-subtract totalizer.

The present machine to which this invention is applied is capable of being used to process both savings and loan transactions. Prior machines have been limited for use in a savings transaction or a loan transaction. Thus the keyboard of the machine could be programmed in such a manner that certain transaction keys would select one side of the add-subtract totalizer for entering amounts therein, or the other side of the totalizer. The present machine is capable of processing different transactions in which the same transaction keys on the keyboard will add into the add-subtract totalizer during one type of transaction and subtract from the add-subtract totalizer during another type of transaction. In order to eliminate a needless duplication of machine structure, it is the object of this invention to provide a keyboard control for modifying the functional operation of various totalizer-selecting keys of the keyboard.

A more specific object of this invention is to provide a mechanism under control of a bank of transaction keys of the keyboard for conditioning a second bank of transaction keys to select either side of an add-subtract totalizer.

With these and incidental objects in view, the invention includes certain novel features of construction and combinations of parts, a preferred form or embodiment of which will hereinafter be described with reference to the drawings which accompany and form a part of this specification.

The invention is shown applied to a window posting machine such as those used in savings and loan financial institutions. This window posting machine is of the type disclosed in United States Letters Patent No. 2,774,298, issued December 18, 1956, to Everett H. Placke et al., and in United States Letters Patent No. 3,158,318, issued November 24, 1964, to George C. Beason et al. The machine disclosed in those patents is used in those systems wherein the depositor is provided with a passbook which is presented to the teller at the time the deposit or the withdrawal is made. As part of this transaction, the passbook is updated to show the new balance.

Figure 1:
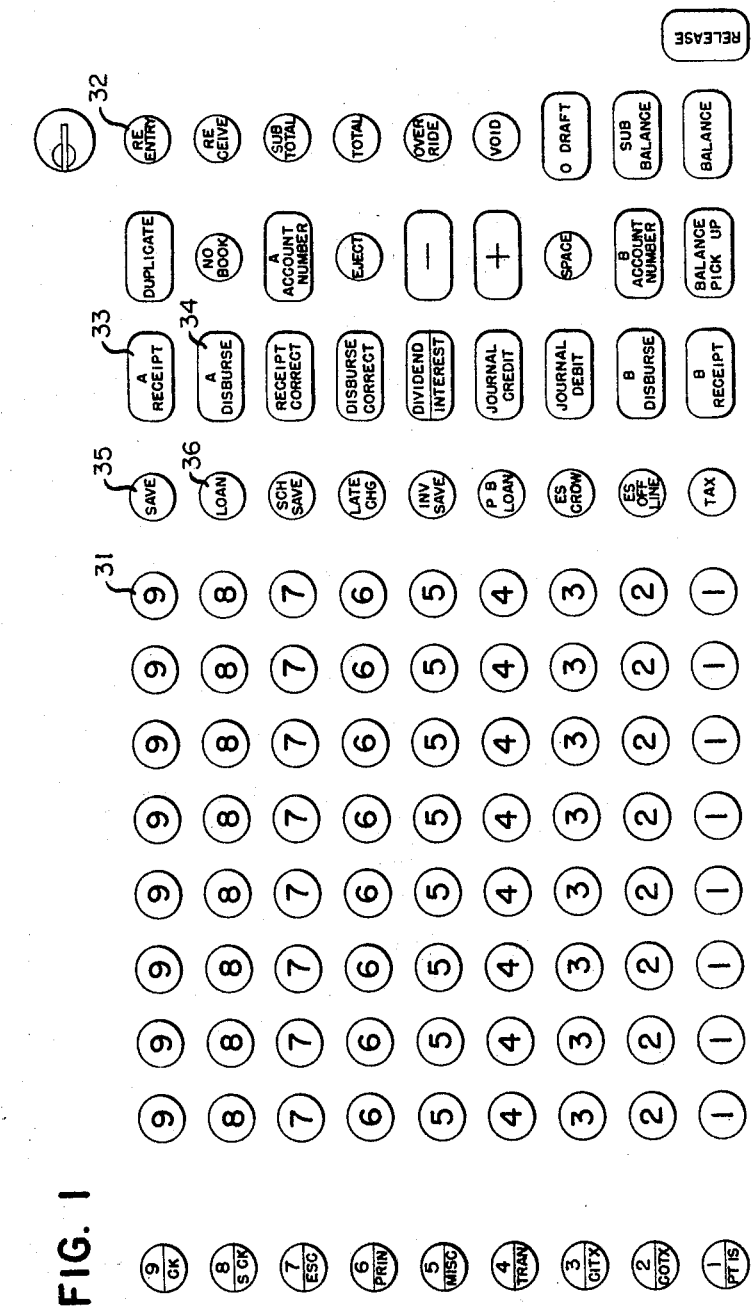
FIGURE 1 is a diagrammatic view of the keyboard.

As disclosed by the above-mentioned United States patents, certain transaction keys, when depressed, will control the add-subtract totalizer in such a manner that amounts entered into the keyboard will add to the old balance or subtract from the old balance, thereby creating a new balance. In the present application, the machine is adapted for use in a savings and loan transaction wherein certain transaction keys are required to add an amount to the old balance during a savings operation and subtract an amount from the principal during a loan operation. Referring to FIGURE 1, there is illustrated the keyboard of the machine used in this application. Included in the keyboard are eight banks of amount keys 31 and four banks of control transaction keys 32. The present invention may be used with any of the transaction keys on the keyboard, but, for purposes of illustration, the invention is described in connection with the "A Receipt" key 33 and the "A Disburse" key 34 in the third transaction row and the "Save" key 35 and the "Loan" key 36 in the fourth transaction row.

Figure 2:
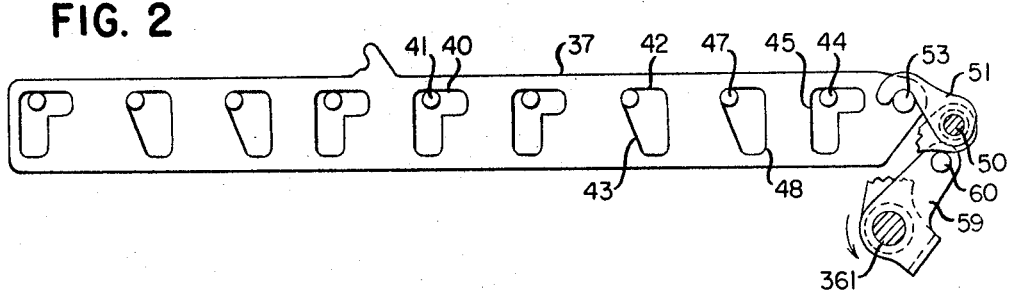
FIGURE 2 is a detailed view of a control plate located in the third transaction bank for controlling the shifting of the add-subtract totalizer.
Figure 3:
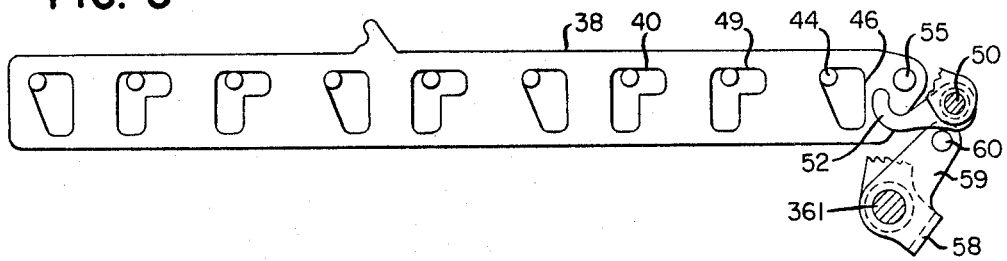
FIGURE 3 is a detailed view of a second control plate located in the third transaction bank for controlling the shifting of the add-subtract totalizer.
Figure 4:
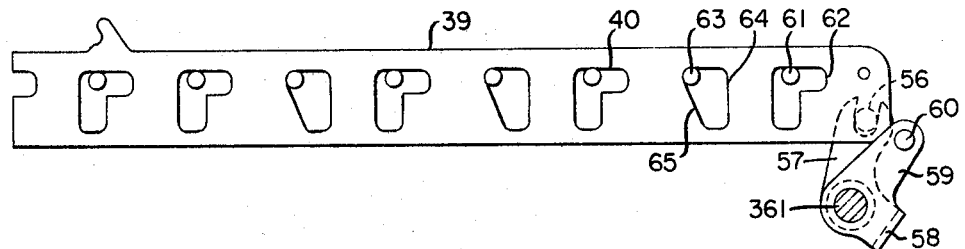
FIGURE 4 is a detailed view of a modifying control plate located in the fourth transaction bank for disabling one of the control plates in the third transaction bank.

As described more fully in the previously-cited Placke et al. United States patent, No. 2,774,298, each transaction bank of keys includes a number of flexible detents or control plates, three of which are shown in FIGURES 2, 3, and 4. The control plates 37 (FIGURE 2) and 38 (FIGURE 3) are located in the third transaction bank, while the control plate 39 (FIGURE 4) is located in the fourth transaction bank. Each of the control plates contains a series of slots, in which is positioned a stud mounted on the stem of a transaction key. As shown in FIGURES 2, 3, and 4, each of the slots is in one of two configurations, the slot 40 allowing the stud 41 of its associated transaction key to move downwardly when the key is depressed, without affecting the position of the control plate, while the slot 42 has an inclined cam surface 43, which coacts with the stud 44 of its associated transaction key to cam the control plate to the left upon depression of the key. This movement of the control plate is used to control machine operations, as fully described in the previously-cited Placke et al. United States patent, No. 2,774,298.

As fully disclosed in FIGURE 62 of the said Placke et al. United States patent, movement of the control plate 368, which is similar to the control plate 37–38 (FIGURES 2 and 3), results in the counter-clockwise rotation of the yoke 362 (FIGURE 5), thus conditioning the add-subtract totalizer to be moved so that the subtract totalizer wheels are aligned with the differential actuators in a manner fully described in said Placke et al. United States patent. In its home position, the add totalizer wheel of the add-subtract totalizer is aligned with the differential actuators. Thus, in an operation when the amount entered into the keyboard is to be added into the add side of the add-subtract totalizer, those transaction keys which are to control such an operation will have a slot similar to the slot 40 (FIGURE 2) located in the associated control plate 37–38, thereby allowing the key to be depressed without effecting a movement of its associated control plate. Where the amount is to be subtracted, those transaction keys which control such an operation will have a slot similar to the slot 42 located in the associated control plate so that the depression of these transaction keys will result in the camming of the control plate, by the stud 41 mounted on the key stem, in a direction which results in the shifting of the add-subtract totalizer in the manner described in the previously-mentioned Placke et al. United States patent.

In the present illustration, the "A Receipt" transaction key 33 in the third transaction row is required to add into the add-subtract totalizer when used with the "Save" key 35 in the fourth transaction row, and subtract from the add-subtract totalizer when used with the "Loan"

key 36. The "A Disburse" key 34 is required to subtract from the add-subtract totalizer when used with the "Save" key 35, and add when used with the "Loan" key 36. It will be seen from this that both transaction keys 33 and 34 have their functional control of the add-subtract totalizer reversed when used with the keys 35 and 36. The mechanism for accomplishing this will now be described.

Mounted in the third transaction row (FIGURE 6) are the control plates 37 (FIGURE 2) and 38 (FIGURE 3), containing slots which accommodate the studs of the transaction keys in that row, as described previously. The "A Receipt" key 33 has its stud 44 positioned within the slot 45 of the control plate 37 and the slot 46 of the control plate 38, while the "A Disburse" key 34 has its stud 47 positioned within the slot 48 of the control plate 37 and the slot 49 of the control plate 38.

Figure 5:
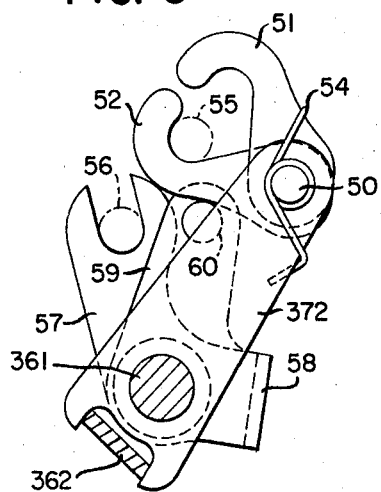
FIGURE 5 is a detailed side view of the modifying control mechanism.
Figure 6:
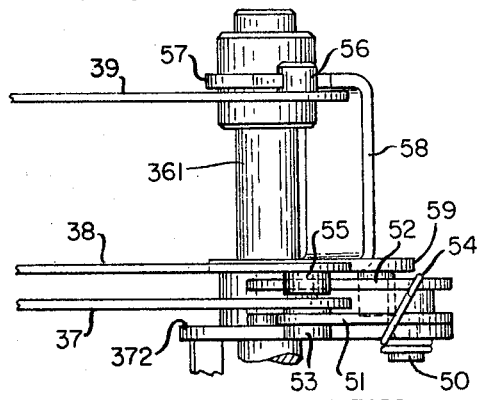
FIGURE 6 is a top view of the modifying control mechanism, showing the arrangement of the various control plates.

Mounted within the side frames of the machine, on the shaft 50 (FIGURES 2, 3, 5, and 6), in front of the control plates 37, 38, are a pair of scissors arms 51, 52. The arm 51 is normally urged into engagement with a stud 53, mounted on the control plate 37, by the spring 54 (FIGURES 5 and 6). The scissors arm 52 is normally positioned adjacent the stud 55, mounted on the control plate 38, and is normally urged by the spring 54 from engagement with the stud 55. With this construction, those keys having a slot in the control plate 37 with a cam surface 43 in the manner described previously will, upon depression, cam the control plate to the left, as disclosed in FIG. 2. This movement of the control plate 37 rocks the arm 372 (FIGURE 5) and the yoke 362 about the shaft 361 through the engagement of the stud 53 by the scissors arm 51, the arm 372 being secured to the shaft 50. As described fully in the previously-cited Placke et al. United States patent, this rocking of the yoke 362 allows the shifting of the add-subtract totalizer, so that an amount entered into the keyboard will be subtracted from the add-subtract totalizer. Those transaction keys in row three having a vertical slot similar to the slot 40 in the control plate 37 will allow, upon depression of the key, the control plate to remain in its home position, thus leaving the add-subtract totalizer in its home, or add, position. With the control plate 37 engaged by the scissors arm 51, depression of the "A Receipt" key 33 will add into the add-subtract totalizer, while depression of the "A Disburse" key 34 will subtract from the add-subtract totalizer.

It will be seen by examining FIGURES 2, 3, and 5 that, upon clockwise rotation of the shaft 50 and the scissors arms 51, 52, the arm 52 will engage the stud 55 of the control plate 38, while the arm 51 is disengaged from the stud 53 of the control plate 37, thus enabling the control plate 38 to control the positioning of the add-subtract totalizer in the manner described previously with regard to the control plate 37. As shown in FIGURE 3, the slot 46 in the control plate 38 associated with the "A Receipt" key 33 will allow the key to subtract from the totalizer, while the slot 49 associated with the "A Disburse" key 34 will allow that key to add into the add-subtract totalizer. Thus the functional control of both transaction keys has been reversed. The mechanism for positioning the scissors arms 51, 52 to accomplish this will now be described.

As shown in FIGURES 4 and 6, located in the fourth transaction row of the keyboard is the modifying control plate 39, which has a stud 56 mounted on its front portion. The stud 56 is engaged by an arm portion 57 of a yoke 58, which extends between the third and fourth transaction rows of keys. The other end of the yoke 58 has an arm portion 59, which has a stud 60 secured thereto. As shown more clearly in FIG. 6, the stud 60 is positioned below the scissors arm 52. It will be seen that a movement to the left (FIGURE 4) of the control plate 39 results in the counter-clockwise movement of the yoke 58 about the shaft 361. This rotation results in the stud 60 engaging and rocking the scissors arm 52, the arm 51, and the shaft 50 clockwise against the action of the spring 54, thereby shifting the control of the add-subtract totalizer from the control plate 37 to the control plate 38 by the engagement of the stud 55 on the control plate 38 by the scissors arm 52.

The modifying control plate 39 has a number of slots similar in configuration to those contained in the control plates 37 and 38. The "Save" key 35 has its stud 61 positioned in the vertical slot 62. Depression of this key results in the control plate 37 controlling the add-subtract totalizer. The "Loan" key 36 has its stud 63 positioned within the slot 64, having the cam surface 65. Depression of the "Loan" key 36 cams the control plate 39 to the left, allowing the control plate 38 to control the shifting of the add-subtract totalizer, as described above. Thus the "A Receipt" key 33 adds into the totalizer when the "Save" key 35 is depressed and subtracts from the totalizer when the "Loan" key 36 is depressed. The "A Disburse" key 34 subtracts from the totalizer when the "Save" key 35 is depressed, and adds into the totalizer when the "Loan" key 36 is depressed. It is obvious that with this construction any key in row three of the transaction bank may be programmed to control the totalizer control function of keys in any other transaction row.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In an accounting machine having an add-subtract totalizer and means for shifting said totalizer to a first position allowing said accounting machine to perform a subtract operation, the combination including
    (a) a first and a second bank of transaction keys;
    (b) first and second control members slidably mounted in said first bank of transaction keys, each of said control members being adapted for movement to a first position upon depression of certain of said transaction keys;
    (c) means controlling the operation of said shifting means, including an arm member mounted on a shaft located adjacent said control members;
    (d) a pair of scissors arms rotatably supported by said arm member and positioned adjacent said first and second control members for alternatively engaging one or the other of said control members;
    (e) means normally urging one of said scissors arms into engagement with said first control member whereby said shifting means is operated upon movement of said first control member to said first position;
    (f) and means for selectively rotating the other of said scissors arms into engagement with said second control member, including
    (g) a third control member slidably mounted in said second bank of transaction keys and adapted for movement to a first position upon depression of certain of said transaction keys in said second bank;
    (h) and an actuating member connected to said third control member and positioned adjacent the other of said scissors arms, said actuating member being adapted to rotate said scissors arm into engagement with said second control member against the action of said urging means upon movement of said third control member to a first position whereby control of said shifting means is transferred from said first control member to said second control member.

2. The accounting machine of claim 1 in which said actuating member comprises a yoke member having one end attached to said third control member and the other end engaging the other of said scissors arms.

3. In an accounting machine having an add-subtract totalizer and means for shifting said totalizer to a first position allowing said accounting machine to perform a subtract operation, the combination including
 (a) a first and a second bank of transaction keys;
 (b) first and second control members slidably mounted in said first bank of transaction keys, each of said control members being adapted for movement to a first position upon depression of certain of said transaction keys;
 (c) means controlling the operation of said shifting means, including an arm member mounted on a shaft located adjacent said control members;
 (d) a first and a second scissors arm supported by said arm member, said first scissors arm being positioned adjacent said first control member and adapted for movement into engagement with said first control member, said second scissors arm being positioned adjacent said second control member and adapted for movement into engagement with said second control member upon the disengagement from said first control member by said first scissors arm;
 (e) resilient means mounted on said arm and normally urging said first scissors arm into engagement with said first control member and disengaging said second scissors arm from said second control member whereby said shifting means is operated upon movement of said first control member to said first position;
 (f) and means for selectively engaging said second scissors arm with said second control member, including
 (g) a third control member slidably mounted in said second bank of transaction keys and adapted for movement to a first position upon depression of certain of said transaction keys in said second bank;
 (h) and a yoke member rotatably mounted on said shaft, said yoke member having one end engaged by said third control member and the other end engaging said second scissors arm whereby upon movement of said third control member to said first position, said yoke member is rotated thereby moving said second scissors arm into engagement with said second control member to allow the second control member to control the shifting of the add-subtract totalizer.

4. In an accounting machine having an add-subtract totalizer and means for shifting said totalizer to perform a subtract operation, the combination including
 (a) a keyboard having a plurality of banks of transaction keys;
 (b) a pair of control slides mounted in one of said banks, said control slides being adapted for movement to an operating position upon depression of certain transaction keys in said bank;
 (c) means for actuating said shifting means;
 (d) means alternatively connecting both of said control slides with said actuating means to allow said connected control slide to actuate said shifting means when said control slide is moved to an operating position;
 (e) means for normally urging said connecting means to connect one of said slides with said actuating means;
 (f) and means for operating said connecting means to connect the other of said slides with said first actuating means, including
 (g) a third control slide mounted in another of said banks, said third control slide being adapted for movement to an operating position upon depression of certain transaction keys in said bank;
 (h) and means actuated by said third control slide when moved to an operating position to operate said connecting means against the action of said urging means whereby actuation of said shifting means is transferred from one to the other of said pair of control slides.

5. In an accounting machine having an add-subtract totalizer and means for shifting said totalizer to a first position allowing said accounting machine to perform a subtract operation, the combination including
 (a) a keyboard having at least a first and a second bank of transaction keys;
 (b) first and second control members slidably mounted in said first bank of transaction keys, said first and second control members being adapted for movement to a first position;
 ($b_1$) a first transaction key for moving, when depressed, said second control member to the first position;
 (c) means controlling the operation of said shifting means, including an arm member mounted on a shaft located adjacent said control members;
 (d) a first and a second scissors arm supported by said arm member, said first scissors arm being positioned adjacent said first control member and adapted for movement into engagement with said first control member, said second scissors arm being positioned adjacent said second control member and adapted for movement into engagement with said second control member upon the disengagement from said first control member by said first scissors arm;
 (e) means mounted on said arm and normally urging said first scissors arm into engagement with said first control member and disengaging said second scissors arm from said second control member whereby said shifting means is operated upon movement of said first control member to said first position;
 (f) and means for selectively engaging said second scissors arm with said second control member, including
 (g) a third control member slidably mounted in said second bank of transaction keys and adapted for movement to a first position upon depression of a second transaction key in said second bank;
 (h) and a yoke member rotatably mounted on said shaft, said yoke member interconnecting said third control member and said second scissors arm and adapted to move said second scissors arm into engagement with said second control member upon depression of the second transaction key to allow the first transaction key to shift the add-subtract totalizer to a first position.

References Cited by the Examiner
UNITED STATES PATENTS

| 2,755,993 | 7/1956 | Christian et al. | 235—60.48 |
| 2,774,298 | 12/1956 | Placke et al. | 101—93 |
| 2,930,523 | 3/1960 | Christian et al. | 235—60.2 |

RICHARD B. WILKINSON, *Primary Examiner.*

STEPHEN J. TOMSKY, *Examiner.*